June 9, 1964     E. S. O'NEILL     3,136,480
WHIP DEVICE
Original Filed Oct. 5, 1961
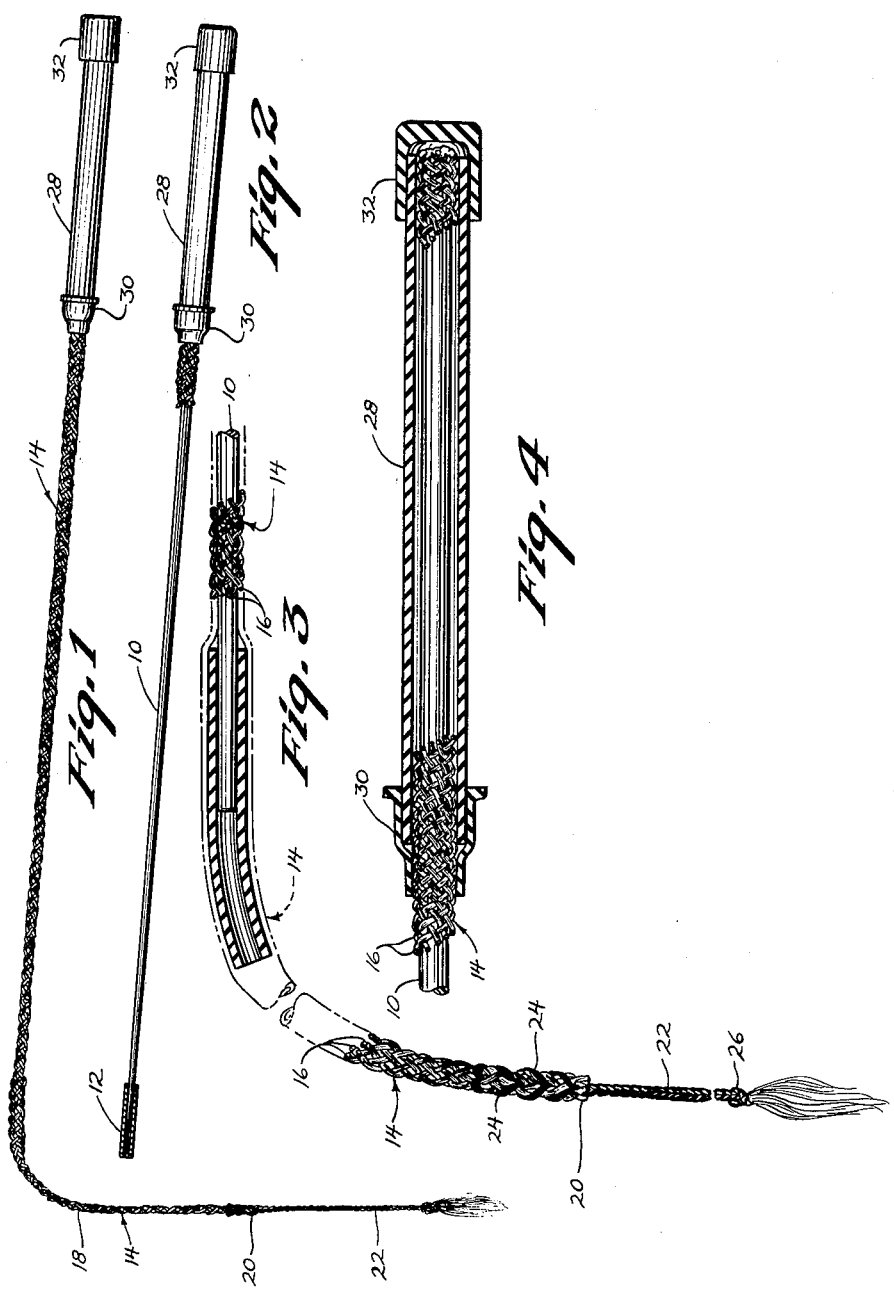
INVENTOR.
*EUGENE S. O'NEILL*
BY
*Talbert Dick & Farley*
*ATTORNEYS*
*WITNESS*
*NORMAN G. TRAVISS*

3,136,480
WHIP DEVICE
Eugene S. O'Neill, 1502 Grand Ave., Spencer, Iowa
Continuation of application Ser. No. 143,071, Oct. 5, 1961. This application June 10, 1963, Ser. No. 291,596
8 Claims. (Cl. 231—2)

This application is a continuation of my copending application Serial No. 143,071 filed October 5, 1961.

Whip devices are commonly used in stockyards and in similar environments to herd and segregate all types of livestock. There have been few changes in the structure of whip devices in the twentieth century and the old rawhide leather whip is still quite often found. Some of the whips known to me are very flexible and have a tendency to drag on the ground when being carried from place to place by the operator. The water and dirt absorbed by these whips detract from the useful life thereof and in some cases, inhibit the use thereof. In addition, many whips are unable to ever withstand the effects of moisture regardless of how it may come in contact with the whip.

Therefore, the principal object of my invention is to provide a whip device which has a shaft of sufficient rigidity that the whip will be supported in an extended position but will still perform a satisfactory whipping phenomenon.

A further object of my invention is to provide a whip device that will completely resist the effects of moisture.

A still further object of my invention is to provide a whip device that is light in weight.

A still further object of my invention is to provide a whip device that will not unnecessarily injure the animals upon whom the whip is used.

A still further object of my invention is to provide a whip device whereby the wearable parts thereof may be easily repaired or replaced.

A still further object of my invention is to provide a whip device that is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIGURE 1 is a perspective view of my device;

FIGURE 2 is a perspective view of my device with the rope element cut away to show the construction of the shaft within the rope;

FIGURE 3 is a partial sectional view of the whipping end of my device with some of the elements cut away to more fully illustrate the construction thereof; and FIGURE 4 is a longitudinal sectional view through the handle of my device.

I have used the numeral 10 to generally designate an elongated tapered circular in cross-section fiberglass shaft. As shown in FIGURE 2, shaft 10 has a smooth outer surface and is tapered to a substantial point from its handle end to its forward end. A piece of rubber tubing 12 extends over the forward end of the shaft 10 as shown in FIGURES 2 and 3. Tubing 12 is flexible and the portion that extends beyond the forward end of shaft 10 can easily be deflected. An elongated covering layer comprised of a hollow woven rope 14 is threaded over the entire length of shaft 10. As shown in FIGURES 3 and 4, rope 14 extends from the rearmost end of shaft 10 and terminates at a point beyond the rubber tubing 12. Rope 14 is comprised of a plurality of plastic cords 16 which are interwoven in the manner shown to create a hollow flexible member. The flexible and resilient characteristics of hollow rope 14 permit it to readily adhere to shaft 10 even though the shaft varies in diameter. These plastic cords are comprised of polyethylene or similar plastic and are completely resistant to the effects of moisture. As shown in FIGURE 1, the "drop top" portion 18 of rope 14 hangs in a limp condition as the rope extends forwardly over the rubber tubing 12. The forward end of rope 14 is fused together at point 20 and this is accomplished by merely heating the ends of the plastic cords 16. A length of braided nylon cord 22 is secured to the forward end of rope 14 by having its fibers 24 interwoven among the plastic cords 16 as shown in FIGURE 3. A knot 26 is tied in the lower end of cord 22 to prevent the unraveling thereof.

With reference to FIGURE 4, the rearward end of shaft 10 is fused to the rearward end of rope 14 by means of applying heat thereto. The plastic cords 16 readily fuse with the fiberglass shaft 10 upon the introduction of excessive heat thereto.

An elongated rubber tube 28 extends over the rearward end of shaft 10 and rope 14 to create a handle element. A collar fitting 30 can be secured to the forward end of tube 28 to refine the appearance of the handle element and a rubber cup 32 can be inserted over the rearward end of the tube 28 to hide the fuse connection between the rope 14 and the shaft 10. If necessary, a suitable adhesive can be placed on the inside of tube 28 to effect its connection to the rope 14 and shaft 10, but if the inside diameter of the tube 28 is small enough, the frictional engagement between the rope 14 and the inside of the tube is sufficient to keep the tube in place.

The shaft 10, by virtue of its fiberglass construction, is rigid enough to normally maintain the elongated condition shown in FIGURES 1 and 2 but it is flexible enough that it will yield to considerable bending pressures. The forward end of shaft 10 is much more "flexible" than the rearward end thereof by virtue of the fact that the shaft is tapered at its forward end. The rubber tubing 12 on the forward or outer tip of shaft 10 prevents the pointed end of the shaft from penetrating between the individual plastic cords 16 in rope 14.

My whip is used in the normal fashion to create noise and to occasionally strike animals when necessary. A rapid whipping movement of my device will cause the shaft 10 to flex somewhat and will cause the "drop top" portion 18 and the "popper" 22 to whip through the air at an accelerated rate of speed. The accelerated speed of the "popper" 22 as it passes through the "sound barrier" creates an audible cracking or popping noise. Obviously, this nylon cord 22 is the element most subject to wear and while being very durable, it can be replaced if necessary by cutting the fibers 24 and unlacing these fibers from the rope 14. A new nylon cord can be secured to the end of rope 14 by merely lacing its fibers through the woven plastic cord 16 in the manner described.

Because my whip is comprised of the relatively light fiberglass shaft 10 and the light plastic rope 14, a stockman can carry and use this whip for an extended period of time without becoming unduly fatigued. The whip is water resistant and will never have its life or use impaired through the effects of moisture. The rigidity of shaft 10 will prevent the whip from dragging the ground during its normal use and there are no elements on the whip that would be unnecessarily injurious to livestock.

Thus, from the foregoing, it is seen that my device will accomplish all of its stated objectives.

Some changes may be made in the construction and arrangement of my whip device without departing from the real spirit and purpose of my invention, and it is my intention to cover by my claims, any modified forms of structure or use of mechanical equivalents which may be reasonably included within their scope.

I claim:
1. In a whip device,
an elongated shaft having forward and rearward ends,
a handle portion on the rearward end of said shaft,
said shaft being of semi-flexible material whereby it will normally maintain its elongated condition but will resiliently yield to lateral deflection,
said shaft being substantially circular in cross section throughout its substantial length to present a complete arcuate outer surface,
said shaft having only a single covering layer except for said handle portion,
said covering layer comprising a single exposed exterior hollow elongated rope movably mounted on said shaft and extending at least from said handle to the forward end thereof,
said rope being in complete and direct engagement with only the arcuate outer surface of said shaft throughout the substantial length of said shaft,
said rope being of uniform construction throughout its cross section, the forward end of said rope terminating in a popper element which extends beyond the forward end of said shaft,
and a tubular means only on the forward end of said shaft and extending slightly beyond the forward end thereof to prevent said forward end from protruding outwardly between the cords of said rope.

2. In a whip device,
an elongated shaft having forward and rearward ends,
a handle portion on the rearward end of said shaft,
said shaft being of semi-flexible material whereby it will normally maintain its elongated condition but will resiliently yield to lateral deflection,
said shaft being substantially circular in cross section throughout its substantial length to present a complete arcuate outer surface,
a single exposed exterior hollow elongated rope on said shaft extending at least from said handle to the forward end thereof,
said rope being in complete and direct engagement with only the arcuate outer surface of said shaft throughout the substantial length of said shaft,
said rope being of uniform construction throughout its cross section,
the forward end of said rope terminating in a popper element which extends beyond the forward end of said shaft;
said rope being comprised of a plurality of woven cords,
and means within said hollow rope and mounted only on the forward end of said shaft and having its forward end extending forwardly from the forward end of said shaft to prevent the forward end of said shaft from protruding outwardly through the woven cords of said rope.

3. In a whip device,
an elongated shaft having forward and rearward ends,
an elongated hollow rope on said shaft and extending beyond the forward end thereof,
said rope being comprised of a plurality of interwoven cords,
a tubular means frictionally mounted only on the forward end of said shaft and positioned between said shaft and said rope to prevent said forward end from protruding outwardly between the cords of said rope, and
said hollow rope is of a plastic construction and is heat fused to said shaft only at the rearward end of said shaft.

4. In a whip device,
an elongated shaft having forward and rearward ends,
an elongated hollow rope on said shaft and extending beyond the forward end thereof,
said rope being comprised of a plurality of interwoven cords,
a tubular means frictionally mounted only on the forward end of said shaft and positioned between said shaft and said rope to prevent said forward end from protruding outwardly between the cords of said rope, and
said rope is comprised of a plastic material and said shaft is comprised of a fiber glass material, and only said rope and the rearward end of said shaft are heat fused together and the cords of said rope beyond the forward end of said shaft are heat fused together.

5. In a whip device,
an elongated shaft having forward and rearward ends,
a handle portion on the rearward end of said shaft,
said shaft being of semi-flexible material whereby it will normally maintain its elongated condition but will resiliently yield to lateral deflection,
said shaft being substantially circular in cross-section throughout its substantial length,
said shaft having only a single covering layer except for said handle portion,
said covering layer comprising a braided rope telescopically mounted on said shaft and extending at least from said handle to a point beyond the forward end thereof,
said rope being in complete and direct engagement with only the outer surface of said shaft throughout the substantial length of said shaft,
said rope being of uniform construction throughout its cross-section, and
a relatively short tubular means of flexible material embracing only the forward end of said shaft in frictional engagement therewith and positioned between said shaft and said rope to prevent said forward end from protruding outwardly between the cords of said rope.

6. The device of claim 2 wherein said means on the forward end of said shaft is of a tubular construction and extends beyond the forward end of said shaft.

7. The device of claim 2 wherein the hollow rope is secured to said shaft only at its rearward end.

8. The structure of claim 2 wherein said rope is comprised of a plastic material and said shaft is comprised of a fiber glass material, and said rope and the rearward end of said shaft are heat fused together and the cords of said rope at the forward end of said shaft are heat fused together.

References Cited in the file of this patent
UNITED STATES PATENTS

| | | |
|---|---|---|
| 182,790 | Avery | Oct. 3, 1876 |
| 312,719 | Holding | Feb. 24, 1885 |
| 511,838 | Felker | Jan. 2, 1894 |
| 1,157,424 | Schmidt | Oct. 19, 1915 |

FOREIGN PATENTS

| | | |
|---|---|---|
| 163,333 | Australia | June 14, 1955 |
| 728,380 | Great Britain | Apr. 20, 1955 |